July 20, 1965  F. ROSKY  3,195,914
VEHICLE SUSPENSION
Filed Jan. 15, 1962  2 Sheets-Sheet 2
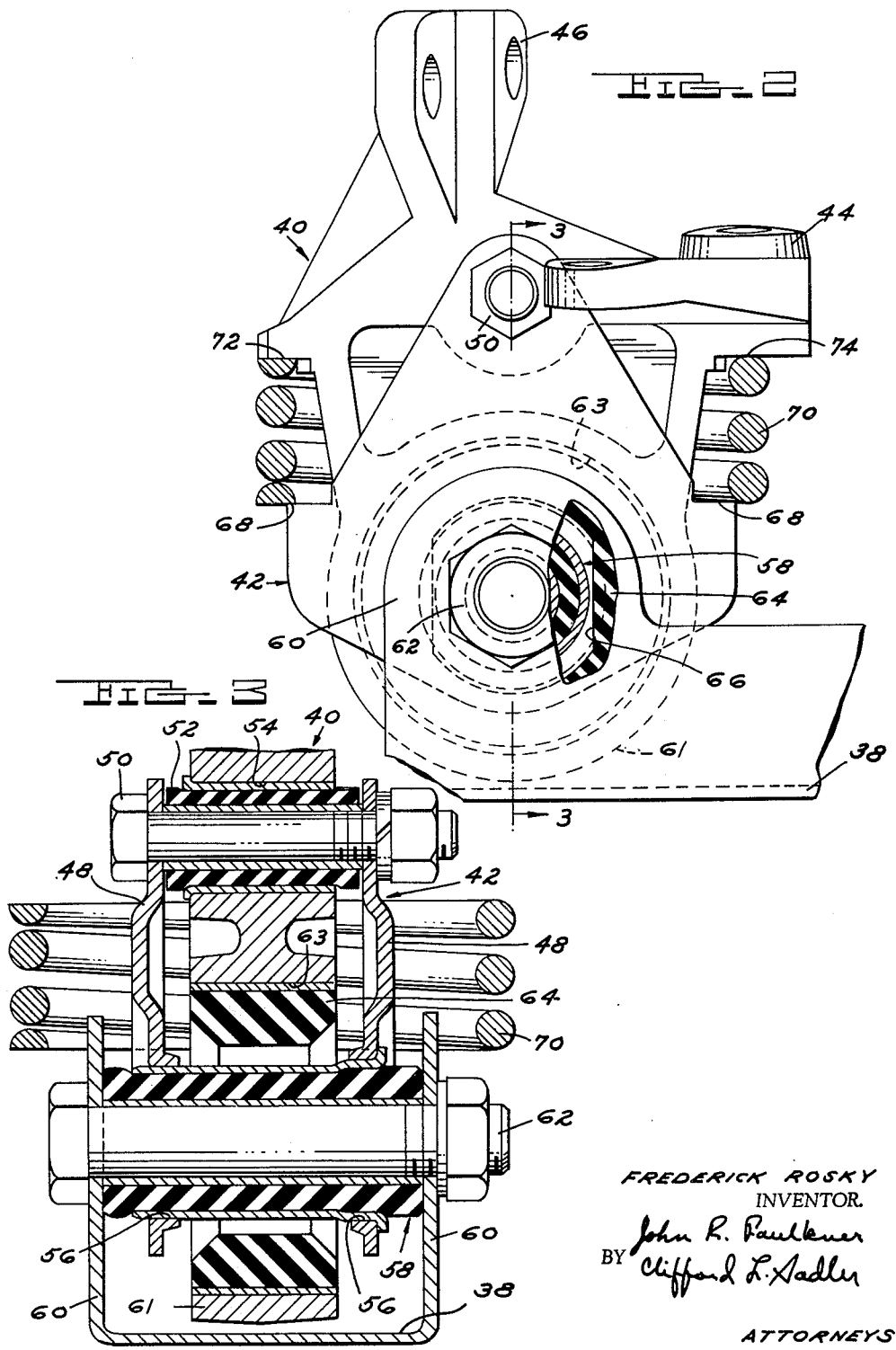
FREDERICK ROSKY
INVENTOR.
BY John R. Faulkner
Clifford L. Sadler
ATTORNEYS

United States Patent Office 3,195,914
Patented July 20, 1965

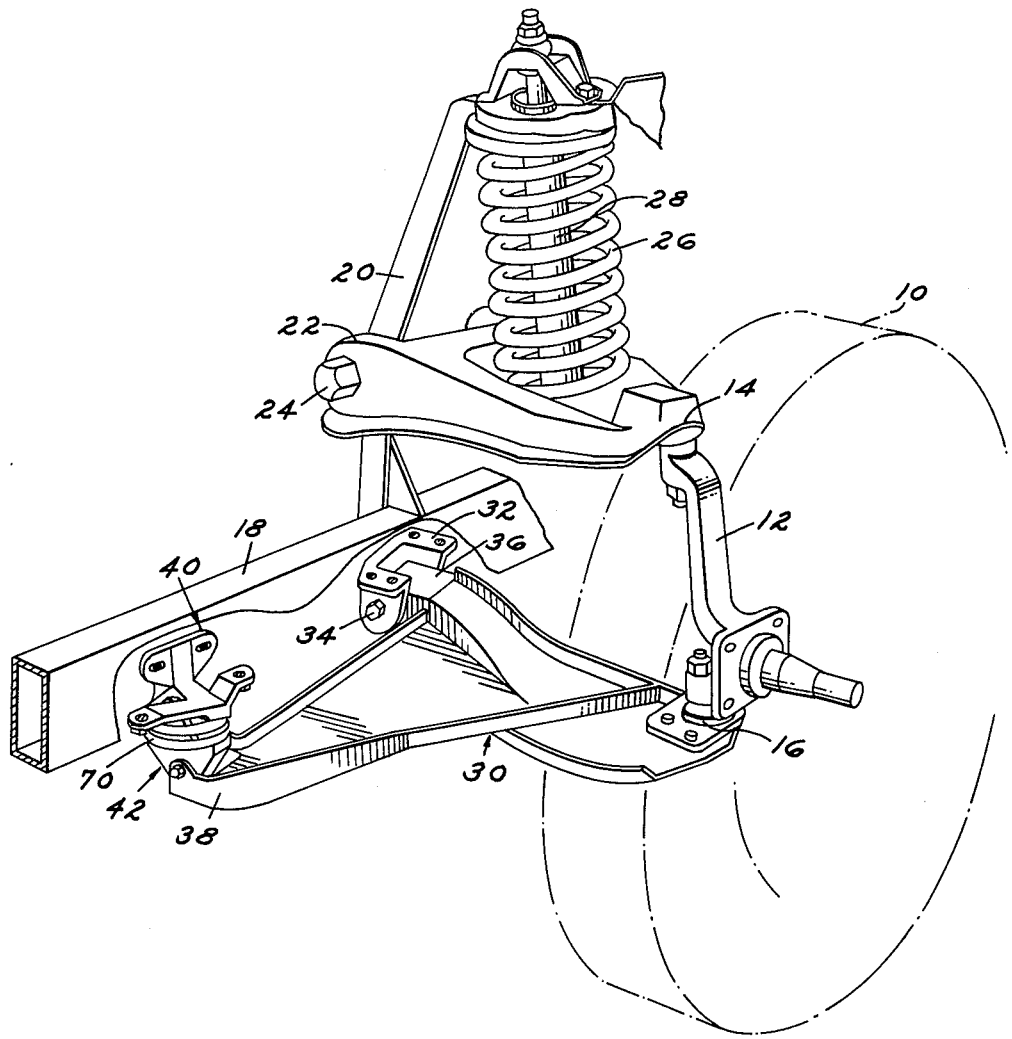

3,195,914
VEHICLE SUSPENSION
Frederick Rosky, Dearborn, Mich., assignor to Ford Motor Company, a corporation of Delaware
Filed Jan. 15, 1962, Ser. No. 166,226
8 Claims. (Cl. 280—96.2)

The present invention relates generally to vehicle suspension systems and more particularly to a suspension system that is characterized by its ability to absorb minor road shocks.

In the conventional vehicle suspension the road whel is supported by suspension arms or other wheel positioning means for vertical jounce and rebound movement. A suspension spring is provided to resiliently absorb and control such movement.

When the road wheel strikes an obstacle both horizontal and vertical forces are present. The conventional suspension system can absorb the vertical forces, however, provisions are not usually present for absorbing the horizontal force component. The result is a shock being transmitted to the passenger compartment of the vehicle when the wheel strikes a stone, tar strip or the like.

In view of the state of the art, it is the principal object of the present invention to provide a vehicle suspension system that is adapted to absorb horizontal forces in addition to vertical forces.

More specifically, in an imbodiment of the present invention a lower suspension arm of an independent front vehicle suspension system is pivotally connected at its inner end to a pair of longitudinally spaced apart pivots carried by the vehicle chassis. The rear pivot is adapted for both vertical and slight horizontal pivotal movement. The forward pivot incorporates an intermediate link that is controlled by a coil spring. When a horizontal force acts upon the wheel, the force is transmitted through the suspension arm and causes the link connection to articulate so that the arm will pivot in a horizontal plane about its rear chassis connection. Under such action the wheel will recede slightly to absorb the horizontal force. In effect, the wheel is adapted to give upon impact to absorb the shock.

The objects and advantages of a vehicle suspension constructed in accordance with this invention will become apparent from the following discussion and the accompanying drawings, in which:

FIGURE 1 is a perspective view of an independent front suspension system incorporating an embodiment of this invention;

FIGURE 2 is an elevational view, partly in section, of the forward pivotal attachment of the suspension arm; and, FIGURE 3 is a sectional view taken along section lines 3—3 of FIGURE 2.

Referring now to the drawings for a better understanding of the invention, FIGURE 1 discloses an independent front suspension system. A road wheel 10 is rotatably supported on a wheel spindle 12 that carries an upper and a lower ball joint assembly 14 and 16 respectively.

The vehicle chassis includes a longitudinal side rail 18 to which reinforce body structure 20 is attached. The inner end of an upper suspension arm 22 is pivotally connected at 24 to the reinforce structure 20. The outer end of the arm 22 is joined to the upper ball joint assembly 14.

A coil type suspension spring 26 has its lower end seated on the upper suspension arm 22 and its upper end secured to an extension of the reinforced body structure 20. A telescopic type shock absorber 28 is concentrically situated within the coil spring 26 and has its upper end secured to the structure 20 and its lower end secured to the spring seat of the arm 22.

A lower suspension arm 30 is provided with its outer end connected to the lower ball joint assembly 16. The inner end of the arm 30 has a pair of fore and aft pivotal connections with the side rail 18.

A bracket 32 is bolted to the underside of the side rail 18 and supports a pivot bolt 34 that passes through a rubber bushing secured to the arm 30. The lower arm 30 has a generally triangular configuration with its outer apex connected to the ball joint assembly 16 and a rearward corner with an extending leg 36 that carries the rubber bushing engaged by the pivot bolt 34 of the bracket 32. The bushing contained at 36 is selected to permit conventional pivotal movement of the arm 30 in a vertical direction about the axis of the bolt 34 and also to permit slight pivotal movement of the arm 30 in a horizontal plane by distortion of the resilient element within the bushing.

Lower arm 30 has a forward leg 38 connected to a frame mounted bracket 40 by an intermediate link 42. The details of this construction are best illustrated in FIGURES 2 and 3.

Bracket 40 has a pair of bosses 44 that are bored to receive bolt for securing to the underside of the frame member 18. Bracket 40 is also provided with a second pair of bosses 46 which are bored out to receive a pair of bolts for securing that portion of the bracket 40 on the inner vertical side of the frame member 18.

The intermediate link 42 has a pair of side members 48 which are provided with a pair of aligned openings at its upper end to receive a pivot bolt 50. A rubber bushing assembly 52 is secured about the pivot bolt 50 and positioned within an opening 54 provided in the bracket 40. The bushing 52 is of the conventional rubber type having inner and outer metallic sleeves that are separated by a cylindrical resilient element.

The link 42 extends downwardly from the pivotal bolt 50 and has a pair of lower aligned openings 56 that receive a second resilient bushing assembly 58. The bushing assembly 58 also has inner and outer concentric metal sleeves that are separated by a cylindrical rubber element. The outer metallic sleeve of the lower bushing 58 is secured in the openings 56. The forward leg 38 of the arm 30 has a pair of upstanding side flanges 60 that are provided with aligned openings through which a pivot bolt 62 passes. The pivot bolt 62 is received within the inner metallic sleeve of the bushing assembly 58.

The mounting bracket 40 has a semi-circular lower portion 61 with a central opening 63 about the bushing assembly 58. A rubber element 64 is positioned within the opening 63.

The rubber element 64 surrounds the bushing assembly 58 in a spaced apart relationship, and provides a resilient stop for pivotal movement of the link 42 and displacement of the bushing assembly 58 carried thereby. From the cut-away portion of FIGURE 2 it will be noted that the opening within the rubber element 64 is not cylindrical but rather has a flat face 66 adjacent the bushing 58 for controlling the latter's movement.

Link 42 has a pair of transversely extending shoulders 68 upon which a coil spring 70 is seated. The coil spring is situated in a surrounding fashion about the link 42 and rests against the shoulders 68. The upper end of the coil spring 70 presses against spring seat portions 72 and 74 formed on the mounting bracket 40. The assembly of FIGURES 2 and 3 is constructed so that the spring 70 is under a compressive load to urge the link 42 downwardly from the pivot bolt 50.

If the wheel 10 should strike an obstacle creating a vertical force, the upper arm 22 will pivot vertically about the pivot 24 and the lower arm 30 will pivot vertically about the axes of the pivot bolts 34 and 62. The link 42 will remain in its position with the axes of the pivot bolts 50 and 62 in vertical alignment due to the centering effect of the spring 70.

When the wheel 10 strikes an obstacle creating a horizontal force component, arm 30 will tend to rotate in a horizontal plane by pivotal movement about the bushing situated at rear portion 36 of the arm 30. Such forces will cause the link 42 to pivot about the bushing assembly 52 to permit leg portion 38 of arm 30 to swing outwardly. This articulation of the link 42 will be resisted by the spring 70 and will be limited by the rubber element 64.

When the link 42 pivots, leg 38 will move transversely to permit the spindle 12 connected to the arm 30 and the wheel 10 carried by the spindle 12 to move in a rearward direction. This permissive wheel recession movement contributes to the reduction of ride harshness. When the horizontal force component has been removed, the force of the spring 70 will cause the link 42 to return to its designed position in which the pivot bolts 50 and 62 are once again in vertical alignment.

The foregoing description presents a preferred embodiment of this invention. Modifications and alterations may occur to those skilled in the art which will come within the scope and spirit of the following claims.

I claim:

1. In a motor vehicle suspension system having sprung and unsprung components, suspension means interconnecting said components, said means having spaced apart pivotal connections with said sprung components, one of said connections being adapted for both vertical and horizontal movement of said means, the other of said connections having an intermediate link interposed between said sprung component and said suspension means, spring means interposed between said link and said sprung components and adapted to control the movement of said link.

2. In a motor vehicle suspension system having sprung and unsprung components, suspension means interconnecting said components, said means including a suspension arm having spaced apart pivotal connections with said sprung components, one of said connections being adapted for both vertical and horizontal pivotal movement, the other of said connections having an intermediate link interposed between said sprung components and said suspension arm, spring means interposed between said link and said sprung components and adapted to control the movement of said link.

3. A vehicle suspension system having a wheel carrying structure, sprung components, an upper suspension arm interconnecting said sprung components and said wheel carrying member, a lower arm interconnecting said sprung components and said wheel carrying structure, said lower arm having a first and second pivotal connection with said sprung components, said first pivotal connection having means adapted for pivotal movement of said lower arm in both vertical and horizontal directions, said second pivotal connection having an intermediate link pivotally connected to said lower arm and to said sprung components, a coil spring surrounding said link and adapted to restrain the movement of said link, said link being adapted for pivotal movement to permit said arm to move about said first pivotal connection in a horizontal direction.

4. A vehicle suspension system having a chassis member, a wheel support member and a suspension arm interconnecting said members, said suspension arm having a pair of spaced apart pivotal connections with said chassis member, one of said pivotal connections being adapted to support said arm for pivotal movement in both a vertical and horizontal direction, the other of said pivotal connections having an intermediate link interposed between said arm and said chassis member, a coil spring surrounding said link and interposed between said chassis member and said link.

5. In an automotive vehicle the combination comprising a road wheel, a support member, a suspension arm, means for rotatably supporting said road wheel from said suspension arm, means for pivotally supporting said suspension arm from said support member at a pair of spaced locations on said support member to permit relative vertical movement between said wheel and said support member, said just mentioned means including a link means interposed between said suspension arm and said support member and adapted to move said arm horizontally relative to said support member in response to a longitudinal force upon said wheel, a spring interposed between said support member and said link means.

6. In an automotive vehicle the combination comprising a frame, a road wheel, a suspension arm rotatably supporting said road wheel, means for pivotally supporting said suspension arm from a pair of spaced locations of said frame to permit upward movement of said road wheel relative to said frame, said means including wheel recession means adapted to cause the portion of said suspension arm positioned adjacent one of said spaced locations to traverse a vertical and transverse path in response to a longitudinal force upon said wheel, a spring interposed between said wheel recession means and said frame.

7. A vehicle suspension system having sprung and unsprung components, a pair of suspension arms interconnecting said sprung and unsprung components, spring means interposed between said sprung components and one of said suspension arms and adapted to support said sprung components on said unsprung components, spaced apart pivotal connection means interconnecting the other of said suspension arms and said sprung components and adapted to permit said other suspension arm to move in jounce and rebound, one of said pivotal connection means being further adapted to permit said suspension means to move in a lateral direction relative to said sprung components, second spring means exerting a force upon said one pivotal connection means resisting said lateral movement of said suspension means.

8. In an automotive vehicle the combination comprising a frame, a wheel support, a pair of suspension arms connected to said wheel support, spring means positioned between said frame and one of said suspension arms, means for pivotally supporting said suspension arms from a pair of spaced locations on said frame to permit upward movement of said wheel support relative to said frame against the force of said spring means, said means including wheel recession means interposed between the other of said suspension arms and said frame and adapted to cause the portion of said other suspension arm positioned adjacent said wheel recession means to traverse a vertical and transverse path in response to a longitudinal force upon said wheel support, a metallic spring interposed between said wheel recession means and said frame.

References Cited by the Examiner

UNITED STATES PATENTS

| 1,800,483 | 4/31 | Taber _____ 267—20 |
| 2,171,947 | 9/39 | Parker. |
| 2,320,552 | 6/43 | Baiz et al. _____ 267—20 |
| 2,372,744 | 4/45 | Sherman. |
| 2,403,145 | 7/46 | Ulrich _____ 267—20 X |
| 2,497,252 | 2/50 | Adams. |

A. HARRY LEVY, *Primary Examiner.*

PHILIP ARNOLD, *Examiner.*